United States Patent
Leuenberger et al.

[11] 3,979,910
[45] Sept. 14, 1976

[54] CLOSED CIRCUIT HYDRAULIC CONTROL SYSTEM

[75] Inventors: Urs Leuenberger, Ville d'Anjou; Rodney Lash LeRoy, Pointe Claire, both of Canada

[73] Assignee: Canada Wire and Cable Limited, Toronto, Canada

[22] Filed: Apr. 16, 1973

[21] Appl. No.: 351,596

[52] U.S. Cl. .............................. 60/476; 60/572; 138/31
[51] Int. Cl.² ..................................... F16D 31/02
[58] Field of Search ............ 60/476, 571, 572, 413, 60/414; 92/60, 165; 138/26, 31; 417/450

[56] References Cited
UNITED STATES PATENTS

| | | | |
|---|---|---|---|
| 1,948,951 | 2/1934 | Walker | 60/432 |
| 2,344,133 | 3/1944 | Davis | 60/328 |
| 2,406,197 | 8/1946 | Christensen | 138/31 |
| 2,684,692 | 7/1954 | Hunter et al. | 138/26 |
| 2,780,065 | 2/1957 | Spannhake | 60/476 |
| 2,967,744 | 1/1961 | Davies | 138/31 X |
| 3,215,164 | 11/1965 | Szczepanski | 138/26 |
| 3,436,914 | 4/1969 | Rosfelder | 60/413 |
| 3,468,261 | 9/1969 | Schmierer | 92/102 |
| 3,537,357 | 11/1970 | Packer | 138/31 X |
| 3,650,182 | 3/1972 | Phillips | 92/165 R |
| 3,841,515 | 10/1974 | Schwartz | 138/31 X |

*Primary Examiner*—Martin P. Schwadron
*Assistant Examiner*—H. Burks
*Attorney, Agent, or Firm*—Fleit & Jacobson

[57] ABSTRACT

A closed circuit hydraulic control system for an hydraulic motor including a cylinder, a piston movable in such a cylinder, and a rod connected to one side of the piston, such cylinder having a blind end and a rod end through which the rod extends. A reversible circulating pump having two ports is provided for supplying fluid under pressure to the blind end and to the rod end respectively of the cylinder. A first tubing interconnects the blind end of the cylinder to one port of the reversible pump, whereas a second tubing interconnects the rod end of the cylinder to the other port of the reversible circulating pump. Means are provided to accommodate the volume of fluid displaced by the rod as the piston is moved toward the blind end of the cylinder.

7 Claims, 6 Drawing Figures

CLOSED CIRCUIT HYDRAULIC CONTROL SYSTEM

BACKGROUND OF THE INVENTION

This invention relates to an hydraulic control system for the operation of linear double-acting hydraulic motors having a cylinder bore with a blind end and a rod end, and more particularly to a closed circuit hydraulic control system for operating such motors which requires no reservoir or separate accumulator and no valve for reversing the flow of fluid in the cylinder.

It is well known that hydraulic control systems incorporating "double-ram" hydraulic motors, that is hydraulic motors having a cylinder bore with two rod ends, could be operated in a closed circuit with no reservoir or separate accumulator. Indeed, since the piston rod of such motors extends on both sides of the piston and through the cylinder ends, the volume of hydraulic fluid displaced by the piston when it moves towards one end of the cylinder is totally absorbed by the vacuum created at the opposite end of the cylinder, assuming that the volume taken by the piston rod is the same at both ends of the cylinder. It is also well known that pairs of hydraulic motors having a cylinder bore with a blind end and a rod end, that is a piston rod extending on one side only of the piston, could be operated in a closed circuit with no reservoir or separate accumulator, provided that each pair of hydraulic motors is connected to a circulating pump in such a manner that the blind end of one cylinder is connected in parallel with the rod end of the other cylinder so that the total volume of liquid displaced by both pistons may be absorbed by the vacuum created behind the pistons. However, hydraulic systems using a single hydraulic cylinder having a cylinder bore with a blind end and a rod end or plural hydraulic cylinders having a blind end and a rod end with their blind ends and their rod ends connected in parallel to a circulating pump, have always required a reservoir or separate accumulator for storing the volume of fluid taken by the piston rod when the piston moves towards the blind end of the cylinder bore.

SUMMARY OF THE INVENTION

It is therefore the object of the present invention to provide a hydraulic system using one hydraulic cylinder having a cylinder bore with a blind end and a rod end, or plural hydraulic cylinders of the above type acting in parallel which permits operation of such motors in a closed circuit having no reservoir or separate accumulator and also no valve for reversing the flow of fluid in the cylinder.

The closed circuit hydraulic control system, in accordance with the invention, includes a reversible circulating pump having two ports for supplying fluid under pressure to the blind end and to the rod end respectively of the cylinder. A first tubing interconnects the blind end of the cylinder to one port of the reversible circulating pump, whereas a second tubing interconnects the rod end of the cylinder to the other port of the reversible circulating pump. The main feature of the invention resides in that means are provided to accommodate the volume of fluid displaced by the rod as the piston is moved toward the blind end of the cylinder.

In a first embodiment of the invention, the second tubing interconnecting the rod end of the cylinder to the second port of the circulating pump is made flexible so as to accommodate the volume of hydraulic fluid taken by the piston rod of the hydraulic motor when the piston moves towards the blind end of the cylinder bore. The concept of the present invention is, however, limited to relatively small hydraulic motors having a displaced volume of fluid up to 0.5 cu. in., this limitation being imposed by the availble range of flexible tubings.

The cylinder may be closed by a plug having its outside diameter welded to the cylinder and an inside diameter having a groove therein into which is placed an O-ring for sealing the piston rod. Such a ring has some capacity to move in its groove and so accommodates a small fraction of the volume of fluid displaced.

In a second embodiment of the invention, the cylinder is closed by a plug having grooves in its inside and outside diameters into which O-rings are located for sealing the cylinder and the piston rod. In this case, the total volume of displaced fluid may be accommodated in the grooves by displacement of the O-rings. Of course, the major fraction of the displaced fluid will be taken by the cylinder seal and only a small fraction by the piston rod seal.

It is to be understood that when the total volume of displaced fluid may not be accommodated by the O-rings, a flexible tubing of lower flexibility may be used to interconnect the rod end of the cylinder to the pump.

BRIEF DESCRIPTION OF THE DRAWING

The invention will now be disclosed, by way of example, with reference to the drawings which illustrate two embodiments of a closed circuit hydraulic control system in accordance with the invention, it being understood that such drawings are not to scale. In the drawings.

DESCRIPTION OF SPECIFIC EMBODIMENTS

Figure 1:
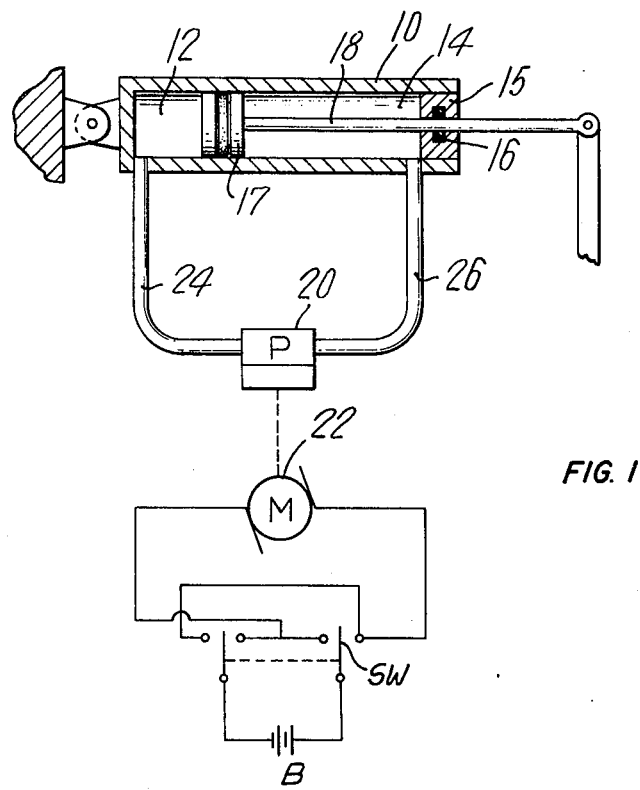
FIG. 1 illustrates a first embodiment of the invention wherein the cylinder is closed by a plug welded, at its outside diameter, to the cylinder.

The system comprises a cylinder 10 having a blind end 12 and a rod end 14 sealed by a plug 15 having its outside diameter welded to cylinder 10 and its inside diameter sealed by an O-ring 16. A piston 17 having a rod 18 attached to one side thereof is movable within the cylinder 10 under the action of the hydraulic fluid pressure created by a reversible circulating pump 20. The pump 20 may be operated by an electric motor 22 powered by a battery B under the control of a reversible switch SW which may be operated manually or by a mechanical arm remotely controlled by radio frequencies.

The circulating pump 20 has two ports and the first port is connected to the blind end 12 of the cylinder through a first tubing 24 whereas the second port of the circulating pump is connected to the rod end 14 of the cylinder through a second tubing 26.

It will be noted that the pump 20 is not connected to a reservoir or a separate accumulator through a valve as it is commonly done in the prior art devices of this type. On the contrary, the system is filled with a suitable hydraulic fluid and operates in a closed circuit. When it is desired to move the piston to the right towards the rod end of the cylinder, the pump is operated so as to circulate fluid through first tubing 24 into the blind end 12 of the cylinder. The fluid compressed by the piston returns to the pump through the second tubing 26.

When it is desired to operate the piston to the left, that is towards the blind end of the cylinder, the pump is operated so as to circulate fluid through second tubing 26 into the rod end of the cylinder. The fluid compressed by the piston returns to the pump. However, since the rod 18 takes the place of a predetermined volume of fluid, such volume of fluid must be absorbed. One means of accommodating such displaced volume in accordance with the invention is to make the second tubing 26 flexible.

Due to the limitations imposed by the available range of flexible tubings on the market, the concept of the invention is limited to relatively small hydraulic motors. Indeed, the size of the piston rod and consequently the size of the hydraulic motor is limited by the amount of expansion that the flexible tubing can take. This depends of course on the module of elasticity of the tubing and on the length thereof. Using flexible tubings, a displacement volume up to 0.5 cu. in. may be envisaged although it would preferably be between 0.05 to 0.25 cu. in.

Figure 2:
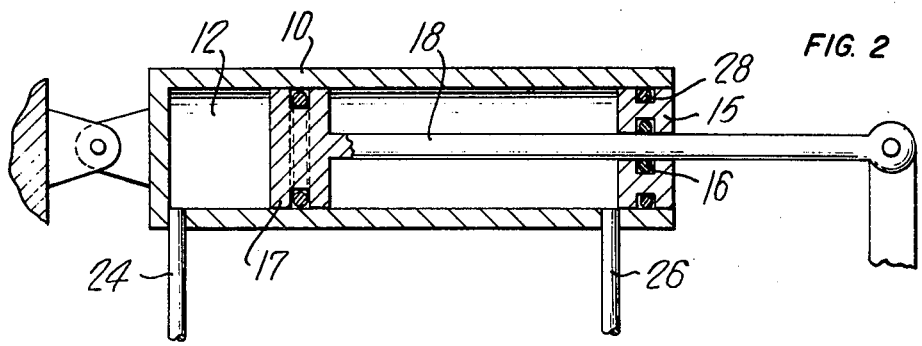
FIG. 2 illustrates a second embodiment of the invention wherein the cylinder is sealed by O-rings.

A second embodiment of the invention is illustrated in FIG. 2 which is identical to FIG. 1 except that the rod end of the cylinder 10 is closed by a plug 15 which seals the end of the cylinder by means of an O-ring 28 located in a groove 30 of the plug and bearing against the inside diameter of the cylinder. The inside diameter of the plug 15 is sealed by means of O-ring 16 in the same manner as FIG. 1 of the drawings. The plug 15 is normally secured to the end of the cylinder by means of screws.

Figure 3:
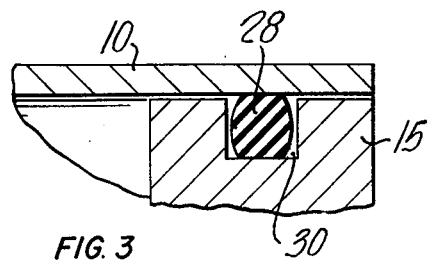
FIGS. 3 and 4 illustrate enlarged views of an O-ring being displaced in its groove by the pressure in the rod end of the cylinder.
Figure 4:
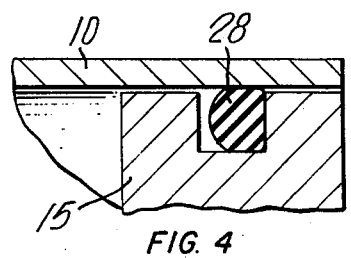

FIGS. 3 and 4 illustrate the principle whereby the O-ring groove 30 can accommodate displaced volume. When no pressure is applied, the O-ring is located in the center of the groove, as illustrated in FIG. 3. However, when pressure is applied by motion of the piston away from the rod end, the O-ring will move to the right as illustrated in FIG. 4. Thus, the volume of the groove which was originally located to the right of the O-ring can, at least partially, accommodate the displaced volume of hydraulic fluid.

Let us take, for example, an O-ring such as sold by Parker Seal Company under Ser. No. 2-117 and use the groove and cylinder bore dimensions recommended for such O-ring in the Parker O-ring Handbook No. OR 5700 (Jan. 1970 revision). Such dimensions are as follows:

| O-ring inside diameter | 0.799 in. |
|---|---|
| O-ring cross-section | 0.103 in. |
| Cylinder inside diameter | 1.000 in. |
| Groove diameter | 0.838 in. |
| Groove width | 0.140 in. |

Based on the above dimensions, the volume available to accommodate fluid displaced is approximately 0.0046 cu. in. It will be appreciated that such volume will increase with cylinders of larger inside diameter.

The percentage (%) of displaced volume per inch of piston stroke which can be accommodated by the cylinder seal at the rod end has been calculated for four O-ring cross-sections W and a number of cylinder inside diameters D, assuming a rod outside diameter of 0.125 in. and is given in the following Table:

TABLE I

% OF DISPLACED VOLUME PER INCH OF PISTON STROKE WHICH CAN BE ACCOMMODATED BY THE CYLINDER SEAL AT THE ROD END (VALUES ARE INDICATED FOR A ROD OUTSIDE DIAMETER OF 0.125 IN.)

| O-Ring Cross Section W (inches) | Cylinder Inside Diameter D (inches) | % |
|---|---|---|
| 0.070 | .237 | 2.3 |
| | .625 | 6.7 |
| | 1.000 | 10.5 |
| | 1.625 | 17.1 |
| | 2.625 | 27.4 |
| 0.103 | .310 | 10.3 |
| | .625 | 22.7 |
| | 1.000 | 37.2 |
| | 1.625 | 61.1 |
| | 2.625 | 95.3 |
| 0.139 | .437 | 26.3 |
| | .750 | 48.7 |
| | 1.000 | 66.7 |
| | 1.625 | 112.0 |
| | 2.625 | 183.0 |
| 0.210 | .875 | 128.0 |
| | 1.187 | 180.0 |
| | 1.625 | 254.0 |
| | 2.625 | 421.0 |

In order to change the values in Table I to those suitable for other rod outside diameters, the percentage values must be multiplied by the factors indicated in Table II:

TABLE II

FACTORS BY WHICH % VALUES OF TABLE I MUST BE MULTIPLIED TO ACCOUNT FOR DIFFERENT ROD SIZES

| Rod Outside Diameter (inches) | Factor |
|---|---|
| 0.125 | 1.000 |
| 0.1875 | 0.444 |
| 0.250 | 0.250 |
| 0.3125 | 0.160 |

Figure 5:
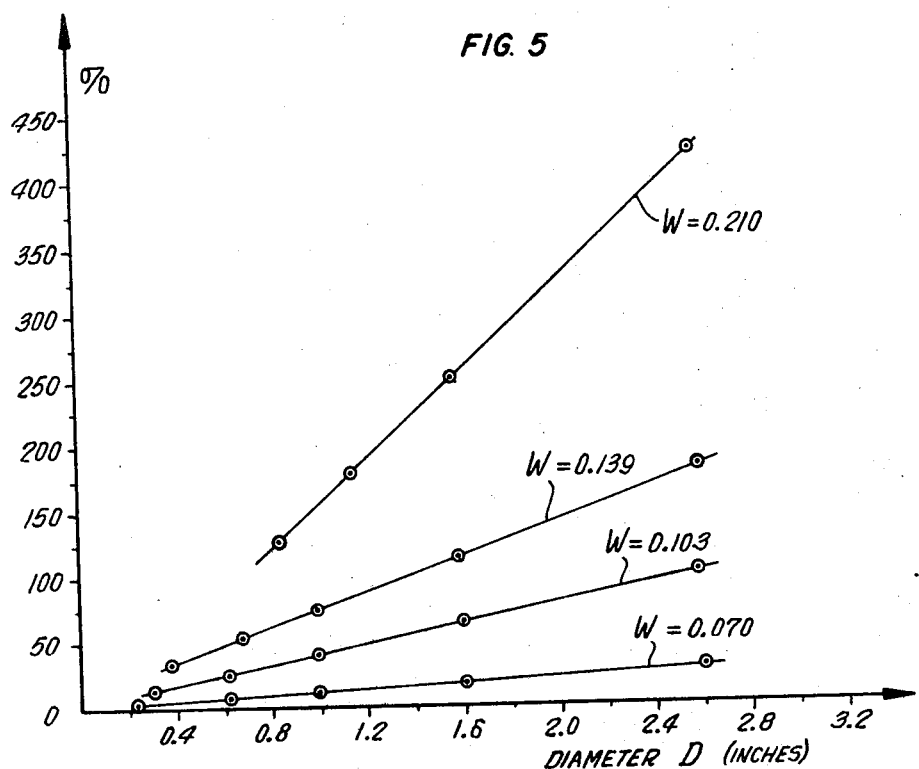
FIGS. 5 and 6 illustrate graphs of the percentage of volume of fluid displaced which can be accommodated by the cylinder seal and by the piston rod seal respectively.

The values of Table I have been plotted in FIG. 5 of the drawings. It will be noted that the curves obtained are straight lines. Consequently, the % of displaced volume per inch of piston stroke can be easily determined from the graphs for other cylinder inside diameters.

THe rod seal can also accommodate some displaced volume of fluid although it will obviously be less than the cylinder seal. The percentage (%) of displaced volume per inch of piston stroke which can be accommodated by the rod seal has also been calculated for three O-ring cross sections W and for several values of the piston rod outside diameter d and is illustrated in the following Table:

TABLE III

% OF DISPLACED VOLUME PER INCH OF PISTON STROKE WHICH CAN BE ACCOMMODATED BY THE ROD SEAL

| O-Ring Cross Section W (inches) | Piston Rod Outside diameter (d) (inches) | % |
|---|---|---|
| 0.070 | .124 | 2.7 |
|  | .155 | 2.0 |
|  | .186 | 1.6 |
|  | .218 | 1.4 |
|  | .249 | 1.2 |
| 0.103 | .124 | 10.7 |
|  | .155 | 7.8 |
|  | .186 | 6.2 |
|  | .218 | 5.0 |
|  | .249 | 4.3 |
| 0.139 | .186 | 12.7 |
|  | .249 | 8.6 |

Figure 6:
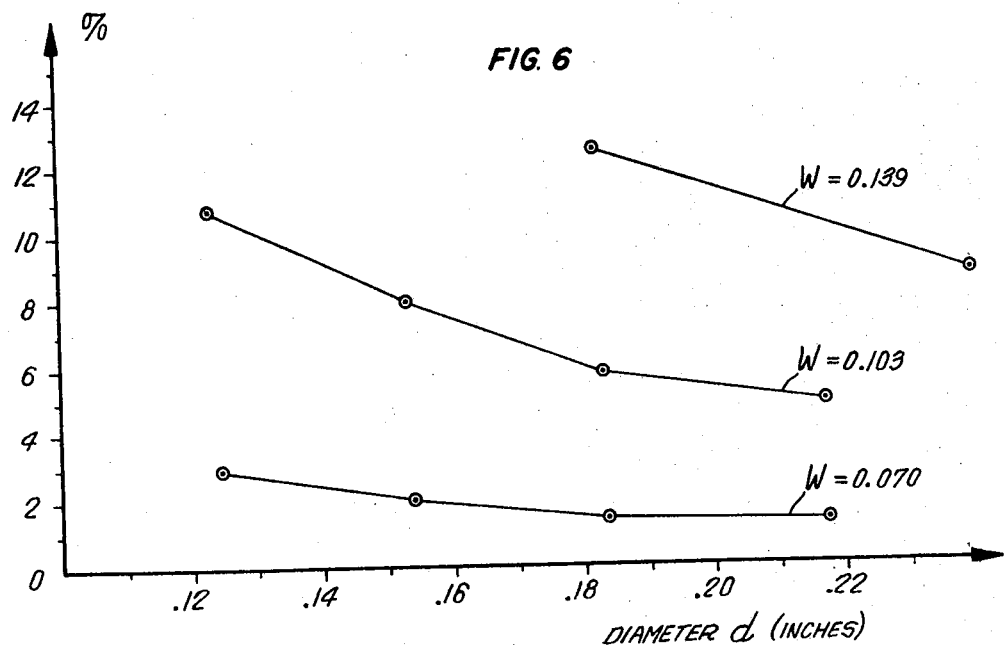

The values of Table III have been plotted in FIG. 6. From such graph, the % of displaced volume per inch of piston rod can be read directly for various piston rod outside diameters.

The values calculated in all the above Tables are based on the groove dimensions recommended in the Parker Handbook referenced above. It will be recognized that there would be some variation in the points if the detailed groove dimensions were changed.

It will be noted, in comparing Table I with Table III that only a small fraction of the displaced fluid can be accommodated by the rod seal. However, if such small percentage is added to the larger percentage accommodated by the cylinder seal, it is possible, in some cases, to accommodate all the displaced volume of fluid. Therefore, it is possible, in some cylinder configurations and sizes to interconnect the rod end of the cylinder to the pump by means of a rigid tubing. It has been found that displaced volumes of approximately 0.01 cu. in. or less may be accommodated this way. Of course, in cases where only a percentage of the displaced volume can be accommodated a flexible tubing of lower flexibility than the one used in the embodiment of FIG. 1 can be used for interconnecting the rod end of the cylinder to the pump.

FIG. 2 illustrates only one of numerous possibilities for sealing the cylinder with an O-ring. For example the O-ring could be mounted in the inside of the cylinder wall. Alternately the plug could be replaced by a cap, with the O-ring mounted on the end of the cylinder, or on the outside surface of it. It will be noted that in each of these cases, the O-ring would be larger than for the situation illustrated in FIG. 2, and so the available volume would be larger.

The concept of the invention has been demonstrated to be viable for several examples as specified below:

EXAMPLE 1

A hydraulic system was constructed as described above, where:

a. The hydraulic cylinder was an aluminum tube of 0.562 inch bore, the piston stroke was 0.750 inch and the piston rod had an outside diameter of one-eighth inch.

b. The circulating pump was a gear pump capable of generating 30 psi of pressure when operating on spindle oil. This pump operated at 800–1500 rpm.

c. 15 inch length of rigid tubing having an outside diameter of one-eighth inch and an inside diameter of one-sixteenth inch and made of nylon.

d. 13 inch length of rubber tubing having an outside diameter of 5/16 inch and an inside diameter of 5/32 inch.

e. The cylinder was sealed by an O-ring having a 0.103 inch cross section (Parker No. 2-110).

f. The rod was sealed by an O-ring having a 0.070 inch cross section (Parker No. 2-006).

As illustrated in FIGS. 5 and 6, in this example, 4% of the displaced fluid should be accommodated in the rod seal, and up to 27% in the cylinder seal, with the balance being accommodated by the flexible tubing.

This hydraulic system operated smoothly in both directions. It has been noted, however, that thinner wall rubber tubing resulted in a jerky movement of the piston in its motion towards the blind end of the cylinder bore.

EXAMPLE 2

A hydraulic system was constructed as described in Example 1, except that the flexible tubing was replaced by a 12 inch length of plasticized PVC tubing having an outside diameter of 5/32 inch and an inside diameter of 3/32 inch. Again the action of this hydraulic system was smooth in both directions.

EXAMPLE 3

A hydraulic system was constructed as described in Example 1, except that the O-ring seals (e) and (f) were both of 1 mm cross section (0.039 inches). Also the tubings (e) and (d) were both ⅛ inch inside diameter copper tubing.

In this example, when the piston was activated in the direction of the blind end, it moved approximately 0.1 inches, and then would not move further. This demonstrates that in this case a tubing of suitable flexibility is required.

Any liquid may be used as a hydraulic fluid. The most suitable liquids are non-foaming and would have a viscosity between 0.3 centripoises (cP) and 2000 cP, preferably between 10 cP and 500 cP.

The above disclosed closed circuit hydraulic system with no reservoir or separate accumulator is particularly useful for operating small laboratory equipment and toys, and more particularly movable portions of model aircrafts such as retractable landing gears. It will be appreciated that weight is critical in model aircrafts and that the elimination of a reservoir or separate accumulator and a valve represents a valuable weight reduction. Indeed, the present system is approximately 50% lighter than a comparable system having the extra reservoir or accumulator and valve. In addition, the cost of our system is reduced by 30–40% by not having the extra reservoirs or accumulator and valve.

In applications where it is important to have low weight, the hydraulic motor may be made of lightweight materials such as aluminum, zinc, their alloys, or plastic. A suitable plastic material is the one sold by DuPont under the trademark DELRIN 500.

Although the invention has been disclosed with reference to a preferred embodiment thereof, it is to be understood that varioius means of accommodating the displacement volume of the piston rod may be envisaged without departing from the scope of the invention. For example, the second tubing interconnecting the rod end of the cylinder to the pump may have only a flexible component therein and be otherwise rigid.

What is claimed is:

1. A closed circuit hydraulic control system comprising:
    A. an hydraulic motor including a cylinder, a piston movable in said cylinder and a rod connected to one side of said piston, said cylinder having a blind end and a rod end through which said rod extends;
    b. a reversible circulating pump having two ports for supplying fluid under pressure to said blind end and to said rod end respectively of said cylinder;
    c. a first tubing defining a first closed path connecting the blind end of the cylinder to one port of the reversible pump;
    d. a second flexible tubing defining a second closed path connecting the rod end of the cylinder to the other port of the reversible pump, said second flexible tubing having suitable elasticity and length for accommodating by expansion the volume of fluid displaced by said rod as the piston is moved towards the blind end of the cylinder, said displaced volume of fluid being up to 0.5 cu. in.

2. A closed circuit hydraulic control system as defined in claim 1, wherein the displaced volume of fluid is between 0.05 and 0.25 cu. in.

3. A closed circuit hydraulic control system as defined in claim 1, wherein the means for accommodating the volume of fluid displaced by said rod includes both said second flexible tubing and seal means for sealing the rod end of said cylinder.

4. A closed circuit hydraulic control system as defined in claim 3, wherein said cylinder is closed by a plug having its outside diameter welded to said cylinder and provided with a central hole through which extends the piston rod, the inside diameter of said plug having a groove therein into which is placed an O-ring for sealing the rod end of the cylinder, said means for accommodating the volume of fluid displaced consisting, for a small fraction, in that the O-ring has some capacity to move in its groove, and, for a major fraction, in that the second tubing is made of flexible material.

5. A closed circuit hydraulic control system comprising:
    a. an hydraulic motor including a cylinder, a piston movable in said cylinder and a rod connected to one side of said piston, said cylinder having a blind end and a rod end through which said rod extends;
    b. a reversible circulating pump having two ports for supplying fluid under pressure to said blind end and to said rod end respectively of said cylinder;
    c. a first tubing defining a first closed path connecting the blind end of the cylinder to one port of the reversible pump;
    d. a second tubing defining a second closed path connecting the rod end of the cylinder to the other port of the reversible pump; and
    e. seal means inserted in said second closed path for sealing the rod end of said cylinder and for accommodating the volume of fluid displaced by said rod as the piston is moved towards the blind end of the cylinder, said displaced volume of fluid being up to 0.5 cu. in.

6. A closed circuit hydraulic control system as defined in claim 5, wherein said cylinder is closed by a plug having a central hole through which extends said piston rod, the outside diameter of said plug being provided with a first groove into which is located a first O-ring for sealing the cylinder end, the inside diameter of said plug being provided with a second groove into which is located a second O-ring for sealing the piston rod end, said means for accommodating the volume of fluid displaced consisting, for a major fraction, in that the first O-ring has some capacity to move in said first groove, and, for a small fraction, in that the second O-ring has some capacity to move in said second groove.

7. A closed circuit hydraulic control system as defined in claim 6, wherein the volume of fluid displaced is up to 0.01 cu. in.

* * * * *